United States Patent [19]

Kanebako et al.

[11] 3,734,513
[45] May 22, 1973

[54] STRAIGHT CHUCK
[75] Inventors: Hiromu Kanebako; Kazutoshi Wada, both of Kimatsu-gun, Chiba, Japan
[73] Assignee: Kuroda Seiko Company, Ltd., Ota-ku, Tokyo, Japan
[22] Filed: May 21, 1971
[21] Appl. No.: 145,854

[30] Foreign Application Priority Data
June 4, 1970   Japan .................................45/54442

[52] U.S. Cl. .....................................279/48, 279/56
[51] Int. Cl. ..............................................B23b 31/20
[58] Field of Search.......................279/48, 49, 56, 36

[56] References Cited
UNITED STATES PATENTS

| | | | |
|---|---|---|---|
| 2,272,185 | 2/1942 | Chittenden | 279/49 |
| 1,880,521 | 10/1932 | Stowell | 279/36 X |
| 2,573,325 | 10/1951 | Fowlie | 279/56 |

Primary Examiner—Andrew R. Juhasz
Assistant Examiner—Z. R. Bilinsky
Attorney—Polachek & Saulsbury

[57] ABSTRACT

This invention relates to a straight chuck of collet type setting in vertical machine tools to use. Revolving a collar along the direction of removal of it, the collet retained within the body portion of the straight chuck and fastened or clamped the external periphery can be loosed and a tool may be removed.

During the revolution of the collar and the loosening of the collet, an upper inclined surface of the collet only in the beginning is disengaged from an opposite and corresponding inclined surface of the body of the straight chuck, without loosening of a shank instantly and throughly, then the collet is prevent from dropping, finally a cramp ring is disengaged from the lower inclined surface so as to loose the tool. From beginning to end, the collet of the straight chuck in accordance with the invention has a sufficient and constant cramp force to prevent the tool from loosing and dropping.

2 Claims, 6 Drawing Figures

PATENTED MAY 22 1973 3,734,513

Hiromu Kanebako + INVENTORS
Kazutoshi Wada

BY *Polachek + Saulsbury*

ATTORNEYS

STRAIGHT CHUCK

DETAILED DESCRIPTION OF INVENTION

This invention relates to a straight chuck having collet setted in and used by a vertical type machine tool, and more particularly to a straight chuck provided with a drop preventing mechanism of tools held in the chuck.

Up to this time, straight chucks provided with collet for tools having straight shanks are troublesome and difficult to receive the tools in, and thereby the tools likely to happen dropped from the chuck accidentally and carelessly. In particular, when drills or cutters are used and they are dropped from the chuck, edges of the drills are broken and snapped frequently, or the work on the table face or table face itself of the machine tool is damaged.

In general, the prevent invention contemplates the provision of a straight chuck provided with a collet, characterized by the inner periphery of the collet received within the main chuck body cramps and holds a straight shank of any tool, and in spite of the collet is loosed, the collet of the straight chuck has a sufficient and constant cramp force to prevent the tool from loosing and dropping.

A principal object of the present invention is to provide a straight chuck having a collet in which the collet is fitted within the chuck body, and the cramping and loosing are regulated microscopically by horizontal smooth revolution of a collar provided on the outer, lower portion of the chuck body.

Another object of the present invention is to provide a straight chuck provided with a collet, in which the collet is fitted within the chuck body, and an upper half face and a lower half outer face of a collet are cramped or loosened alternately, a straight shank portion of a tool mounted in the collet is retained firmly when the collet is cramped, and the straight shank portion is held also with sufficient and constant force to prevent the tool from loosing and dropping even when the collet is loosed.

A further object of the invention is to provide a straight chuck having a collet, wherein the collet is fitted within the chuck body, a stopping frange is arranged around the top and peripheral portion of the collet, and when a shank portion of a tool is inserted within the bore of the collet, said stopping frange of the collet is supported constantly by a receiving inclined surface arranged on the inner peripheral surface of the chuck body, thus the stopping frange prevent the collet from dropping.

In order that the present invention may be more easily understood, and only by way of example, a sheet of drawings is attached in which showing of the straight chuck according to the present invention is being made.

Figure 1:
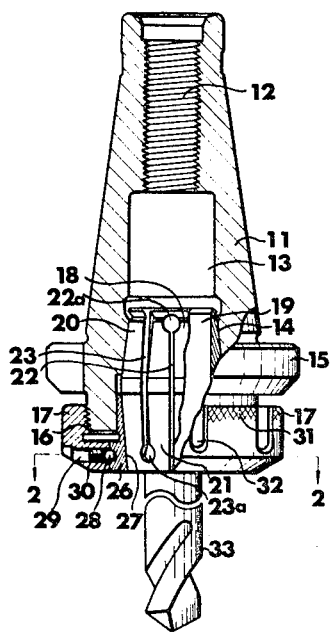
FIG. 1 shows a side sectional view of the straight chuck according to the present invention.
Figure 3:
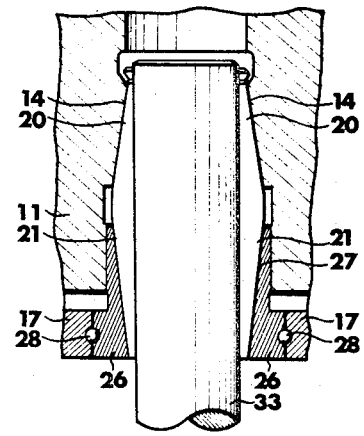
FIG. 3 – FIG. 5 are all sectional view of showing the sequential steps of loosing the collet mounted within the straight chuck.

On the hollow upper portion of the chuck body 11 as shown in FIG. 1, which indicates the whole of the chuck body, a thread 12 for connecting the chuck body with a operating shaft is provided, and a hollow portion 13 connected to the thread portion and an inclined hollow portion 14 extended horizontally, as shown in FIG. 3, are also provided.

A manual handling frange 15 is provided on the appropriate portion of the peripheral outer surface of the chuck body 11, and a thread 16 is provided on the outer periphery of the lower edge of the chuck body so as to threadly engage with the thread of the collar 17.

Within the inclined hollow portion 14, a collet 18 having an upper half inclined surface and a lower half inclined surface is fitted, and then a shank portion 33 of any tool is inserted upwardly into the hollow portion 19 of the collet 18 and is retained there.

Figure 6:
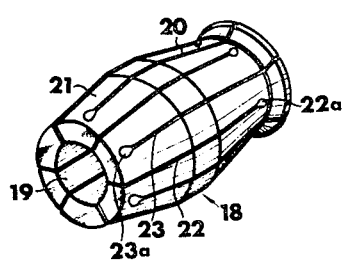
FIG. 6 shows a perspective view of the collet.

The collet 18 as shown in FIG. 6 have a hollow cylinderical shape, which has upper and lower inclined surfaces 20, 21 respectively of circular truncated cone. On the circular wall of the collet 18, slots 22, 23 are arranged one after the other, extending longitudinally from one of the upper and lower openings of the hollow portion 19 receiving a shank portion 33 of any tool to the neighbor portion of the other.

Owing to the slots 22, 23, a little pressure providing on the outer surface of the collet 18 causes shrinkage of the inner surface of said collet. Extruding edge 24 arranged around the periphery of top portion of said collet 18 is engaged on the stopping and corresponding surface 25 provided within the chuck body above the inclined hollow portion 14 thereof, thereby the collet 18 is supported in place.

Figure 2:
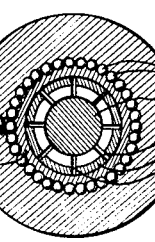
FIG. 2 shows a sectional view of a part taken along the line 2 — 2 shown in FIG. 1.

The inclined surface 27 engaging with the inclined surface 21 arranged on the lower half surface of said collet 18 is provided on the inner surface of a ring 26 engaged with the inner periphery of said collar, and balls 28 are engaged in a hollow opening composed of the grooves of semicircular section provided on the ring 26 and the collar 17 respectively. The balls 28 are as shown clearly in FIG. 2 arranged as ring-shape. The balls 28 are introduced into the hollow opening through the introducing passage 29 arranged in the collar 17, and the passage is closed by a small screw 30.

Knurled portion 31 or depressed portion 32 for driving tool may be arranged appropriatly on the surface of said collar 17. After a shank 33 of any tool is inserted upwardly and completely into the collet 18 of this invention, the collar 17 is made revolution along a fixed direction horizontally and it is made upward movement along the thread 16 on the lower portion of the chuck body 11. Accordingly, the inner face of the ring 26 which is engaged with the collar 17 through the balls 28 pushes the lower half inclined surface 21. Furthermore, the collar 17 is removed, the upper half inclined surface 20 of the collet 18 pushes the hollow inclined portion 14 of the chuck body 11 thereby the circular wall of collet 18 is shrinked generally and the shank portion 33 of the tool is cramped and grasped firmly by the inner surface of the collet.

When the collar 17 is revolved in opposite direction, the ring 26 is downed smoothly and it is disengaged from the lower half surface of collet 18, and the inner surface of the circular wall the collet 18 is disengaged from the shank portion 33 of the tool, thus the tool may be pulled out.

If the angle of inclination of the upper half surface 20 of the collet 18 is made more steep than that of the lower half surface 21, the upper half surface 20 is, during revolution of the collar 17, disengaged from the inclined face 14 of chuck body 11 first, then later the lower half surface 21 is disengaged from the inclined surface 27 of the ring 26 and the collet 18 cramping a shank portion 33 of any tool is loosed to be able to pull out the tool.

When the upper half inclined surface 20 of the collet 18 is separated from the inclined face of the chuck body 11, the extruding edge 24 arranged around the periphery of top portion of said collet 18 is moved outwardly and engaged firmly with the stopping surface 25, thus even if the collet 18 is sufficiently loosed for removal of the tool shaft 33, it is held securely within the chuck body.

Figure 4:
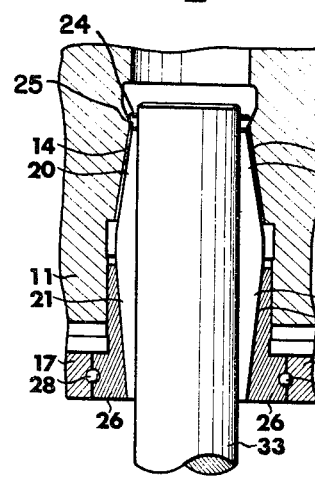
Figure 5:
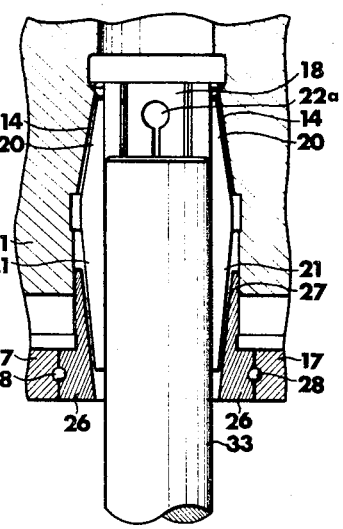

FIG. 3 – FIG. 5 show a sequential steps of a loosing the shank portion 33 of a tool.

While one form of the invention has been shown for purposes of illustration, it is to be clearly understood that various changes in the details of construction and arrangement of parts may be made without deporting from the spirit and scope of the invention as set forth in the appended claims.

We claim:

1. A straight chuck comprising, in combination: a chuck body providing upper and lower ends, defining a concentric hollow channel opening concentrically at the lower end and receivable of an operating tool shaft, and having a lower annularly male-threaded portion, said chuck body hollow channel being formed as chuck body inner upper and lower walled truncated cones; a constricting annular collar defining a channel narrowed at a lower end thereof and having inner-channel female-threads mateable with and mounted on the male-threaded portion so as to revolve the restricting collar horizontally in a plane vertical to said hollow channel; a collet having outer walls shaped as three axially aligned cones, the upper two truncated cones fixedly integrally connected at the respective cones narrowed truncated ends, in which walls defining the upper collet truncated-cone of the collet are more inwardly inclined than walls of the collet middle truncated cone, the collet lower cone being connected at the broad end of the middle second truncated cone, and said collet being mounted in the hollow channel of the chuck body with said collet upper truncated cone receivable within the corresponding chuck upper truncated cone; a rotatable ring having inner annular walls defining a lower truncated cone axially aligned with said hollow channel and with said collet lower truncated cone, and with narrowed ends of the collet lower truncated cone and the ring truncated cone in juxtaposition with one-another and spaced from one-another when said collar is revolved to a state for removal or mounting of a tool shaft, the upper truncated cone of the chuck body and the upper collet cone each being inwardly inclined more than inwardly inclined truncated cone walls of the lower collet cone and of the ring cone; and the collet lower truncated cone being receivable within the corresponding ring truncated cone with their corresponding narrowed cone ends in juxtaposition, the broadened upper end of the ring cone being in juxtaposition to the broadened upper end of the lower chuck cone; said collet having slots each having one open end, extending longitudinally from one of the upper and lower openings of the annular collet walls and extending in axial directions between opposite ends of the collet, with slots alternating in the open-slot end as between alternately opposite ends of the collet; and said upper truncated cones respectively of the chuck and the collet being coordinately inter-actable to exert inward holding-pressure on a tool shank whenever a force moves rotatably said collar in an axially distal direction whereby the upper chuck and collet cones' walls come into contact with one-another, to prevent the tool from dropping from the chuck preparetory to removal of the tool shaft from the chuck.

2. A straigh chuck as claimed in claim 1, wherein balls are arranged in a circle and engaged in a hollow opening composed of grooves of semicircular section provided on the ring and the collar respectively.

* * * * *